E. J. HYDE.
Coffee Roaster.
No. 41,436.                                                    Patented Feb. 2, 1864.
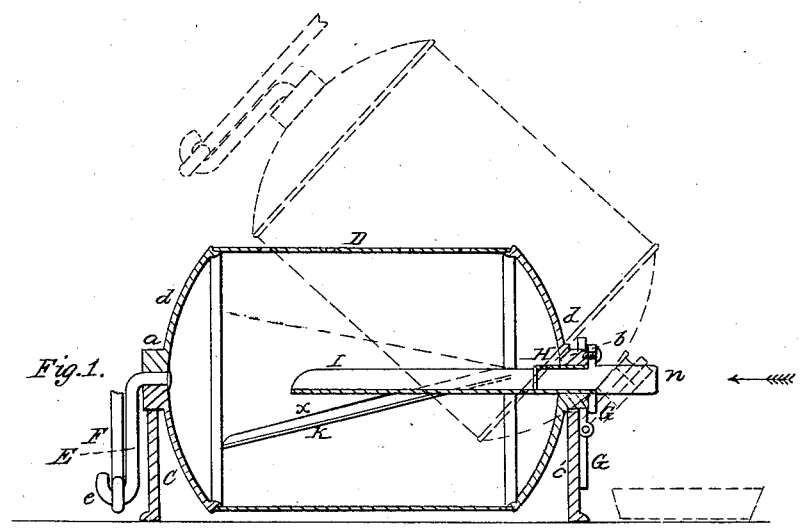
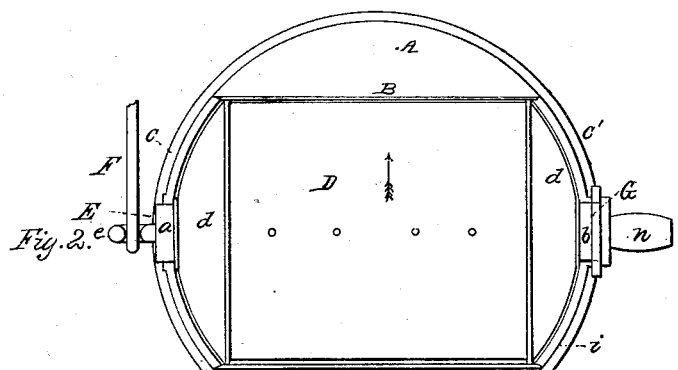
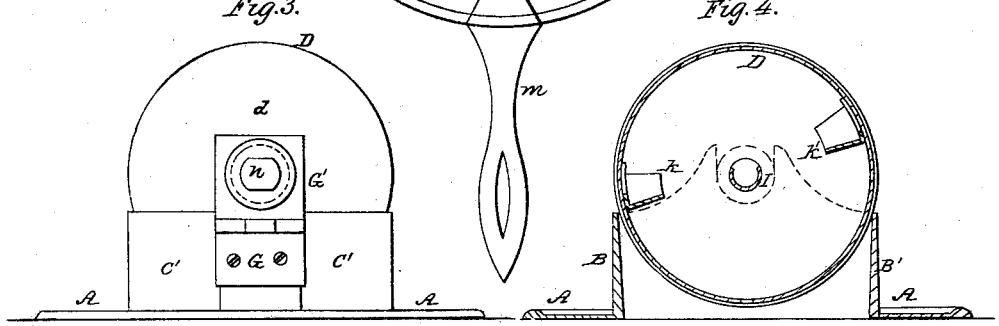
Witnesses:                                                     Inventor:

UNITED STATES PATENT OFFICE.

EDWARD J. HYDE, OF PHILADELPHIA, PENNSYLVANIA.

IMPROVEMENT IN COFFEE-ROASTERS.

Specification forming part of Letters Patent No. 41,436, dated February 2, 1864.

*To all whom it may concern:*

Be it known that I, E. J. HYDE, of Philadelphia, Pennsylvania, have invented certain Apparatus for Roasting Coffee, &c.; and I do hereby declare the following to be a full, clear, and exact description of the same, reference being had to the accompanying drawings, and to the letters of reference marked thereon.

My improved coffee-roaster, which consists of a rotating vessel hinged to a frame, and otherwise constructed in the manner minutely described hereinafter, has been designed with the view of affording facilities for introducing the unroasted coffee into the cylinder for readily testing the coffee during the process of roasting, without stopping the rotary motion; for easily discharging the roasted coffee from the vessel, and for other advantages which will be rendered apparent hereinafter.

In order to enable others to make and use my invention, I will now proceed to describe its construction and operation.

On reference to the accompanying drawings, which form a part of this specification, Figure 1 is a vertical section of my improved coffee-roaster; Fig. 2, a plan view; Fig. 3, an end view, looking in the direction of the arrow, Fig. 1; Fig. 4, a sectional view on the line 1 2, Fig. 1.

Similar letters refer to similar parts throughout the several views.

A is a circular plate, of a diameter somewhat larger than the usual boiler-hole of a cooking stove or range, on which the plate has to rest. In this plate is an elongated opening, rounded at the opposite ends and straight at the opposite sides, and on the edges of this opening are vertical ribs or flanges, the ribs B and B' being at the opposite sides of the opening, and the rounded ribs C and C' at the opposite ends of the said opening, the four ribs forming what may be termed a "continuous flange," edging the above-mentioned elongated opening.

In the center of the rounded rib C is a recess for the reception of the journal $a$ of the hollow cylindrical vessel D, the opposite rounded rib, C', being so formed as to be free from contact with the journal $b'$. This vessel is perforated at suitable points throughout its surface, and is made convex at the opposite ends, $d$ $d$, the convexity being such as to coincide with the concave interior of the rounded ribs C and C', to which the ends of the vessel are as close as possible without being in actual contact.

Into the journal $a$ of the vessel is fitted a crank, E, to the bent end $e$ of which is adapted the end of the rod F, the latter being of suitable length, and furnished at its outer end with an appropriate handle, so that the operator can impart a rotary motion to the vessel through the medium of the crank and rod without exposing his hand and arm to the action of the heated plates of the stove or range.

G and G' are the two parts of an ordinary hinge, the part G being secured to or forming part of the exterior of the rib C', and part G' being arranged for the reception of the journal $b$ of the vessel D, the journal being confined to and turning in this portion of the hinge.

The journal $b$ is hollow for the reception of a metal plug, H, to which is fitted a piece, $h$, of wood or other non-conducting material, so that the plug can be withdrawn without scorching the fingers of the attendant. Secured to or forming a part of the metal plug is a projection, I, the semi-tubular form of which will be best observed on reference to Fig. 4.

To the interior of the vessel D are secured two flanges or vanes, K and K', the flange K on one side of the vessel being arranged in the inclined position shown in Fig. 1, and the flange on the opposite side of the vessel being arranged in a similar inclined position, illustrated by the line $x$ in the same figure.

The desired quantity of coffee to be roasted having been deposited in the vessel through the hollow journal $b$, the opening in this journal having been closed by the plug H, and the plate A having been placed over the boiler opening of the stove or range, and above the fuel in the latter, the attendant imparts a rotary motion to the vessel D through the medium of the appliances already described. As the vessel revolves, the tendency of the flange K is to direct the coffee-berries to one end of the vessel, while the opposite flange, K', has a tendency to direct the coffee to the opposite end of the vessel. A thorough and constant agitation and turning over of the coffee thus takes place, every berry and every portion of each berry being in its turn exposed to the action of the heated surface of the cylinder, and the coffee being consequently uniformly heated throughout, whether the vessel be accidentally heated more at one point than another or not.

It is important that the attendant should be made aware from time to time of the progress of the roasting process. In other coffee-roasting apparatus this can only be ascertained after opening a door or doors, and using a spoon or other like instrument for withdrawing a portion of the coffee to be inspected—a tedious operation, to overcome which has been one of the main objects of my invention.

When the coffee has to be tested. the attendant, seizing the end $h$ of the plug H, withdraws the latter sufficiently to loosen it from its hold on the journal; he then turns the plug until the semi circular projection I occupies the position shown in Figs. 1 and 4, this position being ascertained by a flat place formed on the piece $h$. The plug, with its projection, is then entirely withdrawn, and the coffee-berries examined, without any necessity for stopping the rotation of the vessel. If they are found to be insufficiently roasted, the plug, with its projection, and the coffee in the latter are restored to the vessel, the rotation of the latter being still continued; but if the specimens of coffee are discovered to be sufficently roasted, the plug is temporarily laid on one side, the vessel is so far tilted over or turned on its hinge by means of the rod F and crank E, in the direction shown by red lines, that the whole of the coffee contained in the vessel will escape through the hollow journal $b$ into any suitable receptacle, after which the vessel is depressed to its original position, a new supply of unroasted coffee introduced, and the above described operations repeated.

It will now be seen without further description that every facility is afforded for introducing the coffee into the vessel, for withdrawing it from the same, and for testing the coffee during the process of roasting, without stopping the motion of the vessel—a most important feature, as any stoppage would result in the burning and consequent spoiling of the coffee.

Although I have described the apparatus as used for roasting coffee, it will be evident that it may be used with advantage for the roasting of pop-corn, and for other articles of confectionery which have to be uniformly baked or roasted.

It will also be evident that the cylinder may be applied to differently-formed plates or frames A without departing from the main features of my invention.

In some cases—as, for instance, when chestnuts or other objects of a comparatively large size have to be roasted—the opening for the admission and discharge of the objects may be at a distance from the center of rotation of the vessel, and so situated that on tilting the vessel the contents will be discharged, the opening being provided with a suitable cover or door.

I claim as my invention and desire to secure by Letters Patent—

1. The rotating vessel D, of suitable form, hinged to a frame, substantially in the manner and for the purpose herein set forth.

2. The rotating vessel with its hollow journal $b$, in combination with the plug H and its semi-tubular continuation, or their equivalents, for the purpose specified.

In testimony whereof I have signed my name to this specification in the presence of two subscribing witnesses.

EDWD. J. HYDE.

Witnesses:
 HENRY HOUSON,
 JOHN WHITE.